May 28, 1935.  F. MINUTILLO  2,003,213
AUTOMOBILE JACK
Filed April 11, 1934
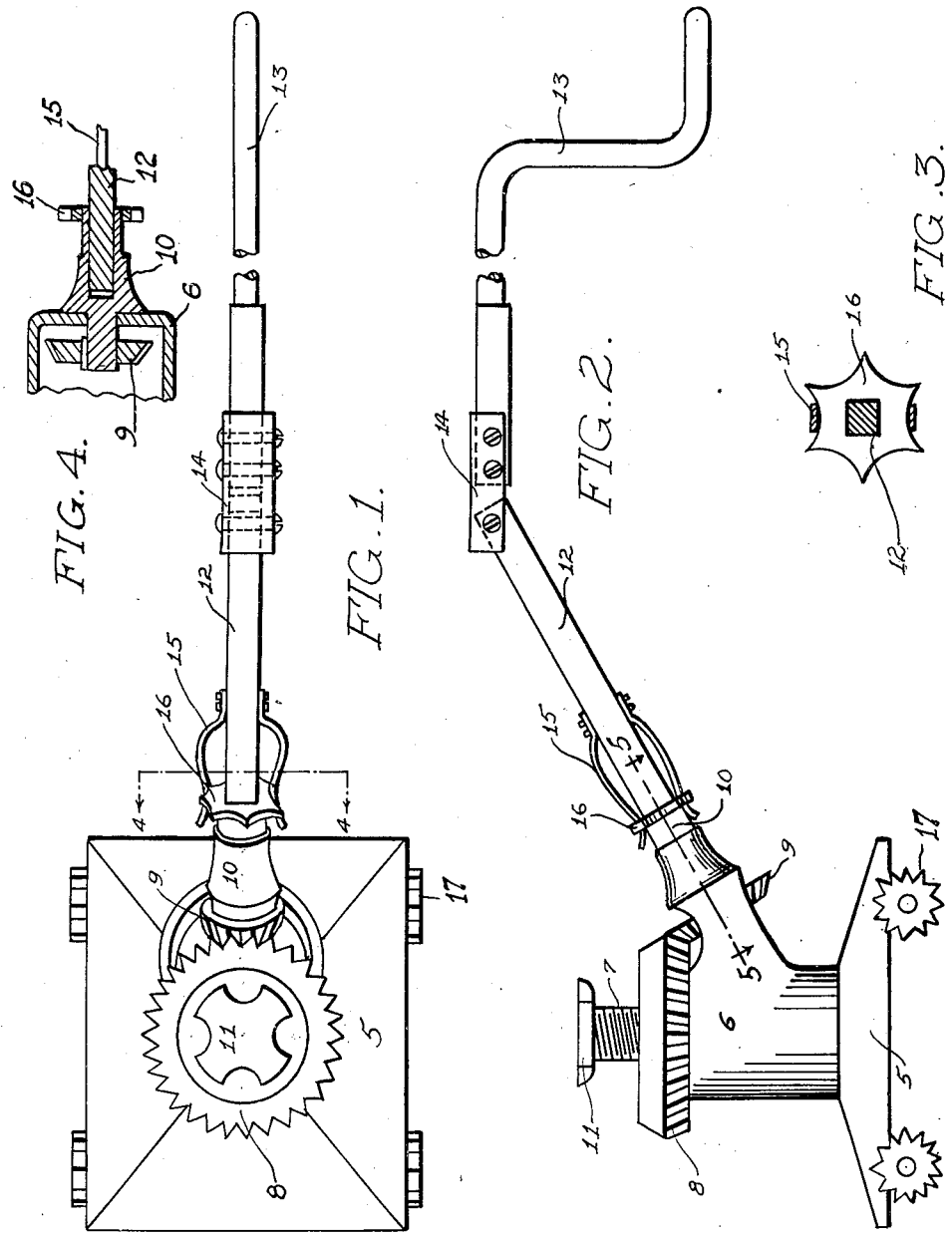
INVENTOR
Frank Minutillo.

Patented May 28, 1935

2,003,213

UNITED STATES PATENT OFFICE 2,003,213

AUTOMOBILE JACK

Frank Minutillo, Manahawkin, N. J.

Application April 11, 1934, Serial No. 720,097

1 Claim. (Cl. 254—1)

This invention relates to automobile jacks and one of the principal objects of the invention is the provision of a jack of this nature in which the necessity of the repairman or automobilist to crawl or reach under the automobile to place the jack into position is eliminated.

A further object of the invention is the mounting of the base of the jack on wheels having serrations so that the jack may be easily rolled under the automobile but will not slide or roll away when vertical pressure is applied.

A still further object of the invention is the construction of an automobile jack which is operated by an extension crank arm, the crank arm shaft fitting into a socket of the jack in the usual manner, but being also supplied with spring grasping fingers so that the jack may be conveniently manipulated into proper position from the extremity of the crank arm, thus eliminating the necessity of the operator crawling under the automobile to position the jack.

With the foregoing and other objects in view, the invention consists in the novel construction, combination and arrangement of parts constituting the invention to be hereinafter specifically described and illustrated in the accompanying drawing which forms a part hereof wherein is shown the preferred embodiment of the invention, but it is to be understood that changes, variations and modifications can be resorted to which come within the scope of the claim hereunto appended.

In the drawing in which similar reference numerals refer to similar parts throughout the several views:—

Fig. 1 is a top view of the jack with operating handle assembled thereto.

Fig. 2 is a side view of Fig. 1.

Fig. 3 is a cross-sectional view on the line 4—4 of Fig. 1.

Fig. 4 is a cross sectional view on the line 5—5 of Fig. 2.

Referring to the drawing in detail, the numeral 5 represents the base of the jack which is usually set on the ground or other support underneath that particular part of the automobile to be elevated. Attached to the base is the cylindrical body portion 6 of the jack in which the screw 7 operates when the gears 8 and 9 are operated. The gear 9 is revolvable with the socket portion 10. The numeral 11 indicates the contact plate. As so far described, nothing of an inventive nature is claimed as the preceding is common with all jacks.

However, with the use of jacks as heretofore described, it was necessary for the operator to reach far underneath the automobile to place it into the proper position for elevating, generally resulting in soiling his clothes and griming his hands. To obviate this difficulty and permit the jack to be placed into position from a convenient location at the sides or ends of the automobile, I provide an extension arm 12 which fits into the socket 10, a foldable crank arm 13 being attached thereto by means of the hinge 14. Attached to the extension arm 12 are spring clamping fingers 15 adapted to frictionally clamp over the circumferentially corrugated washer 16 which in turn is secured to and revolves with the socket 10. The base of the jack rests on serrated wheels 17 which permit easy rolling into position but which will dig into the ground and prevent slipping when the pressure is applied.

From the foregoing it will be evident that, when it becomes necessary to set the jack into position underneath the automobile, all that is required is to fit the operating arm 12 into the socket 10, the curved spring fingers 15 simultaneously fitting over and frictionally grasping the circumference of the washer 16 so that the operating arm and jack will remain associated unless undue manual stress is applied. When so fitted together with the operating arm, the jack may be conveniently pushed or rolled to the desired location from the distance of the crank arm 13, this crank being incidentally operated to more closely and quickly set the jack into desired position as will be readily understood by experienced persons. The jack is also readily removed from underneath the automobile, after the operation has been completed, by simply pulling it out by the crank arm 13, the extension arm 16 then being manually forced from the socket 10, the disassociated parts then being capable of packing into a compact space in the automobile.

It will also be evident that with the use of my invention a considerable amount of time and labor is saved.

What I claim and desire to secure by Letters Patent is:—

An automobile jack mounted on a base plate, a set of serrated rollers mounted to said base, a lifting screw mounted within the jack, a bevel gear mounted to the jack and operating said lifting screw, a bevel pinion rotating the bevel gear, a shaft mounted to said pinion, a square hole at the end of said shaft, a corrugated plate also attached to said pinion shaft, an extensible operating arm adapted to be inserted into the square socket in the pinion shaft, and spring clips attached to said extensible operating arm, said spring clips adapted to frictionally engage the corrugations in said corrugated plate attached to said pinion shaft.

FRANK MINUTILLO.